United States Patent [19]
Friedmann

[11] Patent Number: 5,201,687
[45] Date of Patent: Apr. 13, 1993

[54] CONTINUOUSLY VARIABLE TRANSMISSION WITH HYDRAULICALLY ADJUSTABLE SHEAVES

[75] Inventor: Oswald Friedmann, Lichtenau, Fed. Rep. of Germany

[73] Assignee: Luk Lamellen und Kupplungsbau GMBH, Bühl, Fed. Rep. of Germany

[21] Appl. No.: 616,371

[22] Filed: Nov. 21, 1990

[30] Foreign Application Priority Data

Nov. 21, 1989 [DE] Fed. Rep. of Germany ....... 3938593
Dec. 7, 1989 [DE] Fed. Rep. of Germany ....... 3940460

[51] Int. Cl.⁵ .................................................. F16H 55/52
[52] U.S. Cl. ........................................ 474/18; 474/28
[58] Field of Search .................. 474/8, 17, 18, 23, 28, 474/29, 30, 46, 69, 70

[56] References Cited

U.S. PATENT DOCUMENTS

| | | | |
|---|---|---|---|
| 4,173,156 | 11/1979 | Horowitz | 474/18 |
| 4,228,691 | 10/1980 | Smirl | 474/28 |
| 4,433,594 | 2/1984 | Smirl | 474/46 |
| 4,494,943 | 1/1985 | Takei | 474/18 |
| 4,569,670 | 2/1986 | McIntosh | 474/28 |
| 4,583,423 | 4/1986 | Hahne | 474/28 |
| 4,674,359 | 1/1987 | Hattori | 474/28 |
| 4,767,384 | 8/1988 | Moan | 474/28 |
| 5,009,127 | 4/1991 | Morimoto | 474/18 |

FOREIGN PATENT DOCUMENTS

| | | | |
|---|---|---|---|
| 2828347 | 10/1982 | Fed. Rep. of Germany . | |
| 17054 | 1/1984 | Japan | 474/28 |
| 53353 | 3/1988 | Japan | 474/18 |
| 2033502 | 3/1980 | United Kingdom | 474/28 |

Primary Examiner—Renee S. Luebke
Assistant Examiner—F. Saether
Attorney, Agent, or Firm—Peter K. Kontler

[57] ABSTRACT

A continuously variable belt or chain transmission wherein the input shaft carries a first adjustable sheave and the output shaft carries a second adjustable sheave. The axially movable flanges of the sheaves are displaceable toward the associated fixedly mounted flanges by hydraulic cylinder and piston units. The pressure of fluid in such units is regulated by a torque sensor which is a hydrostatic pump installed between a prime mover and the input shaft and further serves as a means for eliminating peaks of transmitted torque and/or as a clutch. A second pump is provided to supply pressurized fluid to one or more additional cylinder and piston units which are used to change the ratio of the transmission. The cylinder and piston unit for the axially movable flange of the sheave on the output shaft can contain a diaphragm spring serving to permanently bias the respective movable flange against an endless belt or chain which is trained over the sheaves.

34 Claims, 2 Drawing Sheets

CONTINUOUSLY VARIABLE TRANSMISSION WITH HYDRAULICALLY ADJUSTABLE SHEAVES

CROSS REFERENCE TO RELATED CASE

The transmission of the present invention is similar to that which is disclosed in the commonly owned copending patent application Ser. No. 07/616,356 filed Nov. 21, 1990 for "Continuously variable speed transmission" now U.S. Pat. No. 5,046,991 granted Sept. 10, 1991.

BACKGROUND OF THE INVENTION

The invention relates to friction gears in general, and more particularly to improvements in so-called continuously variable transmissions.

A continuously variable belt or chain transmission normally comprises a rotary input shaft which carries a first sheave, a rotary output shaft which is parallel to the input shaft and carries a second sheave, and an endless belt or chain which is trained over the sheaves. Each sheave comprises a first flange which is rigid with the respective shaft and a second flange which is movable axially of the respective shaft toward or away from the corresponding first flange. The transmission further comprises means for moving the axially movable flanges relative to the associated first flanges. Reference may be had to German Pat. No. 28 28 347 wherein the force acting upon the movable flange of the sheave on the input shaft is varied in dependency on transmitted torque by a torque sensor which is or which includes a valve adapted to be adjusted as a function of changes of transmitted torque. The valve controls the flow of a fluid which is supplied by a separate pump and is designed to close, at least in part, when the sensor detects an abrupt rise (peak) of transmitted torque. This entails a corresponding rise of pressure in the cylinder and piston units which are used to change the positions of the axially movable flanges. Consequently, the force with which the flanges of the two sheaves bear upon the adjacent portions of the endless belt or chain increases proportionally with increasing torque. The means for adjusting the valve in response to fluctuations of torque comprises two confronting discs which are provided with cams and bear upon interposed rolling elements. The rolling elements are acted upon by the discs with a force which is proportional to fluid pressure in the valve and to the pressure at the outlet of the pump. When the torque increases as a result of a surge at the input side, the two discs are caused to move apart and one of the discs then reduces the rate of flow, or interrupts the flow, of fluid through an outlet port. The rate of flow of fluid through the port is altered proportionally with the surge of transmitted torque. The discs further serve as a means for mechanically transmitting torque as well as to adjust the valve accordingly, i.e., to reduce the rate of fluid flow through the valve proportionally with an increase of transmitted torque. This entails a corresponding change of the force which the axially movable flanges of the sheaves apply against the adjacent portions of the flexible element. The arrangement is such that the valve normally establishes a path for the flow of hydraulic fluid therethrough (the valve is closed only in response to the development of highly pronounced peaks of transmitted torque). Therefore, the pump must be capable of supplying fluid at a rate which is necessary to establish and maintain a flow through the valve at a rate which is proportional to the magnitude of transmitted torque as well as to ensure that the discs are properly biased against the rolling elements between them, i.e., that the discs can transmit torque to the input member of the transmission. Thus, the quantity of fluid which escapes by way of the normally open valve as well as a result of inadequate sealing is rather high. The fluid is permitted to leak via valve and/or elsewhere at all times, i.e., as long as the transmission is in actual use.

OBJECTS OF THE INVENTION

An object of the invention is to provide a continuously variable transmission, particularly a belt or chain transmission, which can be operate with negligible losses in pressurized fluid.

Another object of the invention is to provide a transmission wherein the torque-dependent pressure can be regulated in a simple and efficient manner.

A further object of the invention is to provide a simple and inexpensive transmission which is capable of reacting to various control impulses in a predictable and reliable manner.

An additional object of the invention is to provide a novel and improved torque sensor for use in the above outlined transmission.

Still another object of the invention is to provide the transmission with novel and improved means for biasing the flanges of the sheaves against the adjacent portions of the endless flexible element which transmits torque from the sheave on the input member to the sheave on the output member.

A further object of the invention is to provide a novel and improved power train between the prime mover and the input member of the above outlined continuously variable transmission.

Another object of the invention is to provide a transmission which can be utilized in motorcycles and other types of motor vehicles as a superior substitute for heretofore known transmissions.

An additional object of the invention is to provide the transmission with novel and improved means for eliminating peaks of transmitted torque.

SUMMARY OF THE INVENTION

One feature of the invention resides in the provision of a continuously variable transmission which comprises rotary input and output members (e.g., two parallel shafts), a first sheave on the input member and a second sheave on the output member. Each sheave comprises a first flange which is affixed to and a second flange which is movable axially of the respective member. The transmission further comprises an endless flexible element (e.g., a belt or a chain) which is trained over the sheaves, and means for displacing the flexible element radially of the sheaves to thereby vary the ratio of the transmission. The displacing means includes a first fluid-operated device having means (e.g., a hydraulic cylinder and piston unit) for moving the second flange of the first sheave relative to the first flange of the first sheave, and a second fluid-operated device (e.g., a hydraulic cylinder and piston unit) having means for moving the second flange of the second sheave relative to the first flange of the second sheave. Still further, the transmission comprises sensor means for varying the pressure of fluid in the fluid-operated devices as a function of variations of torque which is transmitted between the input and output members. The pressure varying sensor means preferably comprises a continuously operated pump which is connected with one of the input and output members.

The transmission further comprises a prime mover (e.g., an internal combustion engine) for the input member, and the pump is or can be installed between the prime mover and the input member, particularly between the prime mover and the first sheave.

In accordance with a presently preferred embodiment, the pump is a hydrostatic pump, e.g., a gear pump. Such pump can include or constitute a starting clutch.

The transmission preferably further comprises a valve or other suitable means for regulating the flow of fluid by way of the outlet of the pump as a function of a driving command. The pump can include a rotary housing, and the transmission can further comprise means for controlling the speed of the housing as a function of a driving command. Such controlling means can comprise a brake.

The pump is preferably operable to transmit torque which is variable as a function of variations of at least one operating parameter of the structure in which the transmission is installed.

The transmission can comprise an additional fluid-operated device in parallel with the first fluid-operated device, and a second pump which serves to supply fluid to the additional device. The additional device comprises means for moving the second flange of the first sheave relative to the first flange of the first sheave in conjunction with the moving means of the first fluid-operated device. Such transmission can further comprise means (e.g., a solenoid-operated valve) for varying the pressure of fluid in the additional fluid-operated device as a function of changes of transmission ratio. The first fluid-operated device can be disposed at a first distance and the additional fluid-operated device can be disposed at a second distance from the axis of the input member. The first distance can exceed the second distance; for example, the arrangement may be such that the additional device is at least partially surrounded by the first device.

In addition to or in lieu of the just discussed additional fluid-operated device, the transmission can also comprise a further fluid-operated device in parallel with the second fluid-operated device, and a second pump which is connected with and serves to supply fluid to the further device. The further device can comprise sheave relative to the first flange of the second sheave in conjunction with the moving means of the second fluid-operated device. Such transmission can comprise means for varying the pressure of fluid in the further fluid-operated device as a function of changes of transmission ratio. The second fluid-operated device can be disposed at a first distance from the axis of the output member, and the further fluid-operated device can be disposed at a second distance from such axis. The first distance can exceed the second distance; for example, the second fluid-operated device can at least partially surround the further fluid-operated device.

If the second fluid-operated device includes a cylinder and piston unit with a cylinder chamber for pressurized hydraulic fluid, the transmission can further comprise at least one diaphragm spring which is installed in the chamber to bias the second flange of the second sheave against the flexible element.

If the pump of the pressure varying sensor means is a hydrostatic pump, such pump can include or constitute a damper. The pump can be installed directly in a power train between the prime mover and the input member to constitute or to form part of a means for transmitting torque from the prime mover to the first sheave. The hydrostatic pump which includes or constitutes a damper can further include a fluid accumulator. The outlet of such pump can be controlled by a prestressed spill valve. For example, the spill valve can regulate the flow of fluid through the outlet of the hydrostatic pump as a function of the magnitude of transmitted torque.

The transmission can comprise an adjustable clutch in the power train between the prime mover and the input member, and means (e.g., a valve) for adjusting the clutch as a function of fluid pressure at the outlet of the pump of the pressure varying sensor means.

If the transmission comprises two or more pumps, the means for adjusting the clutch can include an assembly (e.g., a valve) which adjusts the clutch as a function of fluid pressure at the outlet of one of the pumps.

The clutch can be adjusted by torque-dependent means. Such torque-dependent means is or can be regulatable as a function of predetermined operational parameters.

The pump of the fluid pressure varying sensor means is or can be arranged to deliver variable quantities of hydraulic fluid, and at least the first and second fluid-operated devices can include portions which are deformable to accommodate the fluid which is delivered by the pump when the transmitted torque assumes a predetermined value. Such portions of the fluid-operated devices can include expandible walls.

Another feature of the invention resides in the provision of a continuously variable belt transmission which comprises rotary input and output members (e.g., two parallel shafts), and first and second sheaves on the input and output members, respectively. Each sheave includes a first flange which is affixed to and a second flange which is movable axially of the respective member, and the transmission further comprises an endless flexible element (e.g., a belt or a chain) which is trained over the sheaves, and means for displacing the flexible element radially of the sheaves to thereby change the transmission ratio. The displacing means comprises at least one diaphragm spring which reacts against one of the members and bears upon the respective second flange to urge such second flange against the flexible element. The one member is or can be the output member. The at least one diaphragm spring preferably has a degressive characteristic curve and is operative to bias the respective second flange with a greater force when the flexible element is nearer to the axis of the input member (i.e., when the second flange of the first sheave is more distant from the first flange of the first sheave) and with a lesser force when the flexible element is more distant from the axis of the input member (i.e., when the second flange of the first sheave is nearer to the first flange of the first sheave).

The displacing means can further comprise a fluid-operated device including a cylinder and piston unit serving to move the second flange on the one member axially of the one member. The at least one spring can be installed in the cylinder chamber of such unit.

The novel features which are considered as characteristic of the invention are set forth in particular in the appended claims. The improved transmission itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
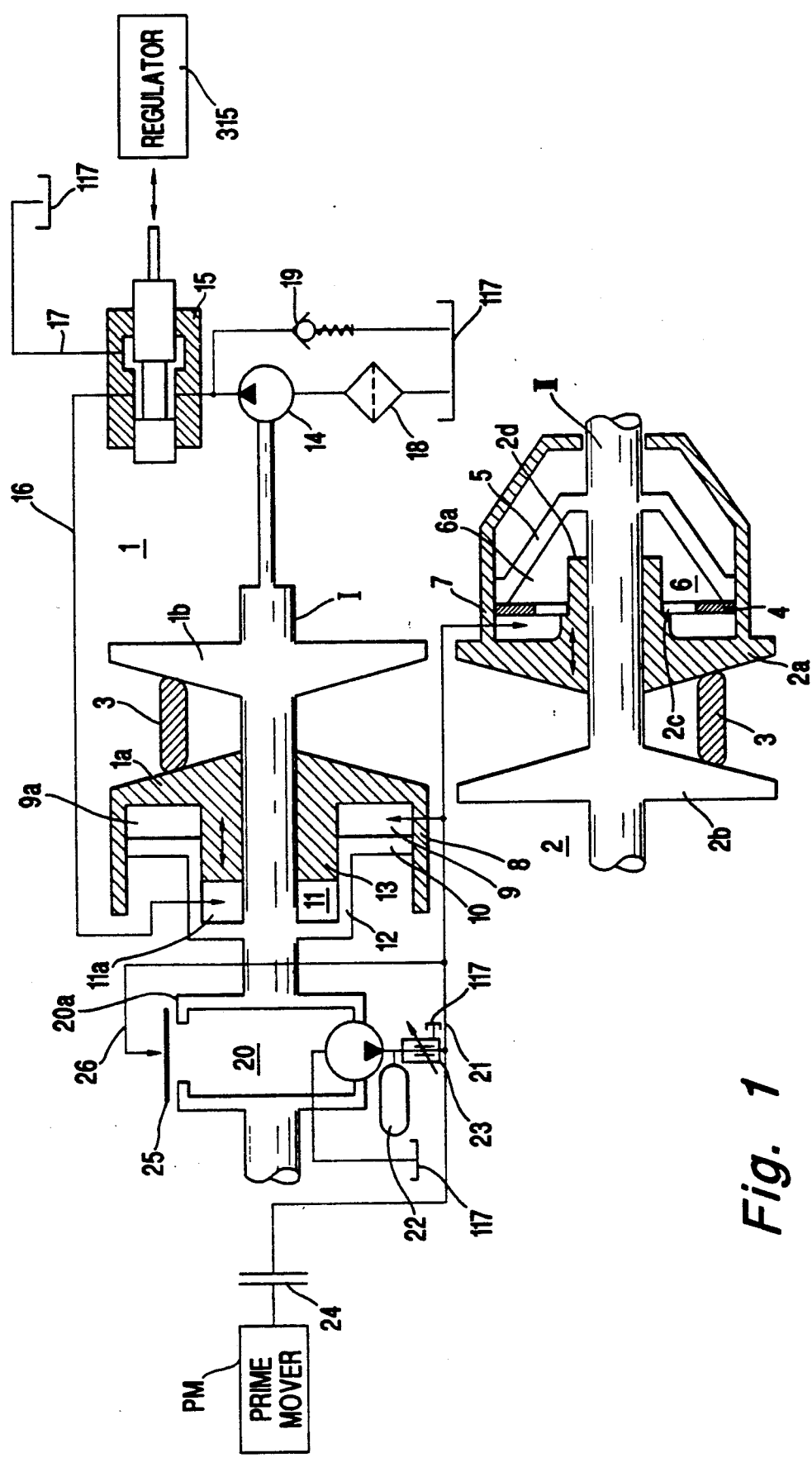
FIG. 1 is a fragmentary schematic partly elevational and partly axial sectional view of a continuously variable transmission which embodies one form of the invention.

FIG. 1 shows a continuously variable belt or chain transmission which comprises a rotary input member I (e.g., a shaft which is driven by a prime mover PM, such as the engine in a motor vehicle) and a rotary output member II (e.g., a shaft which is parallel with the input member I and serves to transmit torque to one or more driven components, e.g., to the wheels of a motor vehicle through the medium of a transmission). The input member I carries a first sheave 1 which comprises a first conical flange 1b affixed to the input member and a second conical flange 1a which is movable axially of the input member toward and away from the first flange 1b. The output member II carries a second sheave 2 including a first conical flange 2b which is affixed to the output member and a second conical flange 2a which is movable axially of the output member toward and away from the first flange 2b. An endless flexible element 3 (e.g., a chain or a belt) is trained over the pulleys 1, 2 so that a first portion of the flexible element is located between the flanges 1a, 1b and a second portion of the flexible element is located between the flanges 2a, 2b. The flexible element 3 is movable radially of the input and output members I, II in response to movements of second flanges 1a, 2a relative to the respective first flanges 1b, 2b to thereby vary the ratio of the transmission, i.e., to change the ratio of RPM of the input member I relative to RPM of the output member II.

In accordance with a feature of the invention, the means for displacing the flange 2a axially of the output member II comprises at least one diaphragm spring. FIG. 1 shows a single diaphragm spring 4 which reacts against a piston 5 on the output member II and bears against an external shoulder 2c on a hub 2d of the flange 2a. The hub 2d is movable axially of but need not rotate on the output member II. The magnitude of force which the diaphragm spring 4 applies to the flange 2a in a direction to move it toward the flange 2b depends upon the ratio of the transmission. The illustrated diaphragm spring 4 has a degressive characteristic curve and is designed to bias the second flange 2a toward the first flange 2b of the sheave 2 with a greater force when the flexible element 3 is nearer to the axis of the input member I (i.e., when the distance of the flanges 1a, 1b from each other is increased), and with a lesser force when the flexible element 3 is more distant from the axis of the input member I (i.e., when the distance of the flanges 1a, 1b from each other is reduced). In other words, the spring 4 causes the flange 2a to bear upon the adjacent portion of the flexible element 3 with a greater force when the transmission ratio is reduced but with a lesser force if the transmission ratio is increased.

The means for displacing the flexible element 3 radially of the input and output members I, II further comprises a first fluid-operated device 9 here shown as a hydraulic cylinder and piston unit having a cylinder 8 rigid with the flange 1a and a ring-shaped piston 10 rigid with the input member I, and a second fluid-operated device 6 in the form of a second cylinder and piston unit including the aforementioned piston 5 which is rigid with the output member II and a cylinder 7 which is rigid with the flange 2a. The unit 9 defines a cylinder chamber 9a, and the unit 6 defines a cylinder chamber 6a. The cylinder 8 can move the flange 1a axially toward the flange 1b, and the cylinder 7 can move the flange 2a axially toward the flange 2b. The diaphragm spring 4 is installed in the chamber 6a of the second cylinder and piston unit (fluid-operated device) 6. FIG. 1 shows that the cylinder 8 is an integral part of the flange 1a, that the cylinder 7 is an integral part of the flange 2a, that the piston 10 is an integral part of the input member I, and that the piston 5 is an integral part of the output member II.

The cylinder and piston unit 9 is mechanically connected in parallel with an additional fluid-operated device 11 in the form of a cylinder and piston unit defining an annular chamber 11a and including a sleeve-like piston 13 which is integral with the flange 1a and a ring-shaped cylinder 12 which is integral with the input member I. The cylinder 12 is rigid with (e.g., integrally connected to) the piston 10 of the cylinder and piston unit 9. The piston 13 is integral with the cylinder 8. The piston 13 need not be rotatable on but is movable axially of the input member I.

The transmission of FIG. 1 further comprises a pump 14 which is driven by the input member I and controls the pressure in the cylinder chamber 11a of the unit 11 by way of an adjustable slide valve 15 in a conduit 16 which connects the output of the pump 14 with the chamber 11a. The position of the valving element in the slide valve 15 is adjusted in dependency on the desired or necessary transmission ratio so that the axial position of the flange 1a relative to the flange 1b of the sheave 1 is adjusted accordingly. The additional cylinder and piston unit 11 is nearer to the axis of the input member I than the first cylinder and piston unit 9; in fact, the unit 9 at least partially surrounds the unit 11. Depending on the axial position of the valving element of the slide valve 15, the conduit 16 can supply pressurized hydraulic fluid from the pump 14 into the cylinder chamber 11a (to thereby cause the flange 1a to move the adjacent portion of the flexible element 3 radially of and away from the axis of the input member I) or into the sump 117 via conduit 17. Shifting of the flexible element 3 between the flanges 1a, 1b radially of and away from the input member I takes place against the opposition of the diaphragm spring 4 which permanently urges the flange 2a toward the flange 2b, i.e., in a direction to move the portion of the flexible element 3 between the flanges 2a, 2b radially of and away from the axis of the output member II. The pump 14 draws hydraulic fluid (e.g., oil) from the sump 117 by way of a filter 18. The reference character 19 denotes a relief valve which opens when the pressure at the outlet of the pump 14 exceeds a preselected value so that pressurized fluid can flow from the outlet of the pump 14 into the sump 117 by a route other than through the slide valve 15 and conduit 17.

The improved transmission further comprises means for varying the pressure of fluid in the chambers 6a, 9a of the cylinder and piston units 6, 9 as a function of variations of torque which is transmitted between the input and output members I and II. Such fluid pressure varying means comprises a torque sensor in the form of a hydrostatic gear pump 20 which is installed directly in the power train between the prime mover PM and the input member I. The pump 20 acts as a hydrostatic clutch and is installed in such a way that its housing 20a can rotate with the input member I. The output of the pump 20 discharges pressurized hydraulic fluid into a conduit 21 which delivers such fluid into the cylinder chambers 6a and 9a. The pump 20 is continuously driven, i.e., it causes a continuous flow of fluid via outlet and into the conduit 21. The pressure of such fluid is proportional to the transmitted torque, and the pump 20 transmits the torque hydrostatically to the pulley 1. Thus, the pump 20 constitutes the only means for generating fluid pressure which is proportional to the transmitted torque and is utilized to urge the axially movable flanges 1a and 2a against the adjacent portions of the flexible element 3. Furthermore, the pump 20 constitutes the only means to generating additional pressure which is to be applied to the axially movable flanges 1a, 2a in the event of abrupt rise of torque in order to cause the flanges 1a, 2a to bear against the adjacent portions of the flexible element 3 with a force which is a function of fluctuations of transmitted torque. When the transmitted torque is constant, the quantity of liquid which is discharged by the pump 20 suffices to compensate for leakage in the pump 20 proper, in the conduit or conduits which connect the inlet of the pump 20 with the sump 117, and in various adjusting or regulating elements. Thus, losses in fluid are minimal, at least while the transmitted torque is constant. At the same time, the fluid pressure in the chambers 6a and 9a (i.e., the force with which the flanges 1a, 2a bear upon the adjacent portions of the flexible element 3) is proportional to the magnitude of transmitted torque.

The illustrated design of the cylinder and piston units 9 and 11 ensures that the pressure which prevails in the chamber 11a and is dependent upon the transmission ratio is added to the torque-dependent pressure in the chamber 9a. Moreover, the torque-dependent pressure in the chamber 6a of the cylinder and piston unit 6 for the axially movable flange 2a is added to the bias of the diaphragm spring 4 which, as stated above, permanently tends to urge the flange 2a toward the flange 2b.

In the event of an abrupt rise of transmitted torque, the pressure of fluid in the cylinder chambers 6a, 9a rises accordingly and the additional fluid which is then supplied by the pump 20 can be taken up by properly dimensioned portions (particularly walls) of the cylinder and piston units 6 and 9. Such walls undergo deformation which is needed to provide room for the additionally supplied pressurized fluid. If the transmitted torque decreases, the housing 20a of the pump 20 simply turns backwards through a corresponding angle, namely to receive the additional fluid which has caused a flexing or bulging of the walls of units 6, 9 minus losses due to leakage.

The diaphragm spring 4 in the cylinder chamber 6a ensures that, when the transmission ratio is changed due to radial movement of the flexible element 3 toward the axis of the input member I (i.e., as a result of movement of the flange 1a away from the flange 1b), fluid is caused to flow from the cylinder chamber 11a of the additional cylinder and piston unit 11 via conduit 16, slide valve 15, relief valve 19 and into the sump 117. At the same time, the diaphragm spring 4 ensures that hydraulic fluid flows from the cylinder chamber 9a, through the conduit 21 and into the cylinder chamber 6a.

An advantage of the diaphragm spring 4 is that the axially movable flange 2a is caused to bear against the adjacent portion of the flexible element 3 at all times, i.e., even in the absence of transmission of torque. An advantage of the aforediscussed design and mounting of the diaphragm spring 4 (so that the spring bears upon the flange 2a with a greater force when the flexible element 3 is nearer to the axis of the input member I) is that the spring 4 tends to move the flexible element 3 away from the axis of the input member I during starting, i.e., the spring then tends to select a transmission ratio which is more satisfactory for starting of the transmission, namely at a time when the pump 14 is yet to pressurize fluid and convey pressurized fluid, or convey requisite quantities of pressurized fluid, into the cylinder chamber 11a of the additional cylinder and piston unit 11. Such transmission ratio is that ratio which causes the flexible element 3 to rotate the output member II at a relatively low speed. Moreover, the diaphragm spring 4 ensures that the transmission is ready to transmit torque in the event of partial or complete failure of the hydraulic system including the units 6, 9, 11 and the pumps 14, 20.

An advantage of the feature that the cylinder and piston unit 11 is nearer to the axis of the input member I than the cylinder and piston unit 9 is that the space requirements of these components of the hydraulic system are reduced accordingly. Moreover, the placing of the unit 11 nearer to the axis of the input member I brings about the advantage that the pump 14 can be designed to deliver relatively small quantities of fluid because the volume of other hand, the placing of the torque-dependent cylinder and piston unit 9 at a greater distance from the axis of the input member I ensures a highly satisfactory pronounced pressure intensification.

The pump 20 can further constitute or form part of a damper in the power train between the prime mover PM and the input member I. This is due to the fact that this pump can act as a hydraulic clutch. To this end, the pump 20 is connected with or comprises a variable-capacity fluid accumulator 22 which is connected to its output and can store a requisite quantity of pressurized hydraulic fluid.

The transmission of FIG. 1 preferably further comprises a solenoid-operated valve 23 which is installed between the output of the pump 20 and the conduit 21 and serves to damp the maxima (peaks) of transmitted torque. The valve 23 opens for short intervals of time in response to the development of peaks of transmitted torque in order to discharge relatively small quantities of pressurized fluid into the sump 117. For example, the valve 21 can be designed to open for a short interval of time when the fluid pressure in the conduit 21 rises above a predetermined value. In addition, pressure peaks can be eliminated or reduced, for example, by opening the valve 23 accordingly while the rate of conveying the fluid remains unchanged or is increased when the torque reaches a predetermined value as a function of certain operational parameters.

The illustrated solenoid-operated valve 23 can be replaced with a simpler spill valve which is installed in prestressed condition or is regulated in dependency on fluctuations of transmitted torque in such a way that, in the event of the development of peaks of transmitted torque well above the nominal torque of the prime mover PM (i.e., in response to rise of fluid pressure which is generated by the pump 20), the spill valve opens to permit escape of corresponding quantities of pressurized fluid. Thus, the fluid pressure which is generated by the pump 20 can be used (either directly or indirectly) to regulate the elimination of peaks of transmitted torque.

Since the pressure of fluid in the pump 20 is proportional to the prevailing torque, the pump 20 can further serve to control the operation of an adjustable starting clutch 24 in the power train between the prime mover PM and the sheave 1 on the input member I. Pressurized fluid leaving the pump 20 via conduit 21 can be used to engage the clutch 24 or to regulate the transmission of torque via clutch 24 from the prime mover PM to the input member I. When the transmitted torque reaches a peak value, the pressure of fluid acting upon the clutch 24 can be merely reduced or reduced down to zero, for example, in dependency on abruptly increasing pressure in the conduit 21 (such pressure increases proportionally with abruptly increasing torque).

Still further, abrupt increases of transmitted torque can be counteracted and eliminated by the expedient of reducing the ability of the clutch 24 to transmit torque when the torque exceeds a value corresponding to a preselected position of the throttle valve in a motor vehicle. Reference may be had to commonly owned published German patent application No. 39 12 562.9.

The pump 20 can be used to start the transmission, for example, by replacing the illustrated solenoid-operated valve 23 with a embodying the transmission is at a standstill, the pump 20 does not transmit torque to the sheave 1. The valve which replaces the valve 23 is closed in response to a driving command so that the pump 20 is then in a condition to transmit torque from the prime mover PM to the sheave 1 on the input member I.

Still further, the pump 20 can serve as a starting clutch by providing a brake 25 which is applied against the rotary housing 20a in response to a driving command. The application of brake 25 entails a corresponding reduction of transmission of torque from the prime mover PM to the sheave 1 on the input member I. The operation of the brake 25 (i.e., the speed of the housing 20a) can be regulated by pressurized fluid in the conduit 21; to this end, the conduit 21 communicates with a conduit 26 which conveys pressurized fluid to the brake 25. Thus, the braking action upon the housing 20a can be regulated in dependency on abrupt changes of transmitted torque, i.e., in response to abrupt changes of fluid pressure in the conduits 21 and 26. Such regulation of braking action upon the housing 20a of the pump 20 can take place during starting as well as during normal operation of the transmission.

It is further within the purview of the invention to utilize the pump 14 in lieu of the pump 20 as a means for regulating the operation during starting. To this end, the conduit 26 will be replaced with a conduit which receives pressurized fluid from the conduit 16 or directly from the outlet of the pump 14. The pump 14 can also serve as a means for counteracting and eliminating fluctuations of transmitted torque (particularly peaks of transmitted torque).

The pump 14 or 20 can be used to control the clutch 24 during starting as well as during other stages of operation of the transmission.

When the valve 23 (which is adjustable in response to a driving command) is fully open (i.e., when there is no opposing torque), hydraulic fluid is merely circulated from and back to the sump 117 and no torque is being transmitted to the sheave 1. Such mounting of the valve 23 enables the pump 20 to act as a starting clutch. As already mentioned above, another mode of using the pump 20 as a starting clutch is to provide the transmission with the brake 25 which can regulate the rotational speed of the housing 20a. The braking action is regulated in dependency on a driving command.

The valve 23 enables the pump 20 to eliminate abruptly developing peaks of transmitted torque by the simple expedient of regulating the transmission of torque by the pump 20, e.g., in dependency on torques which are selected for certain operational parameters. For example, the valve 23 can be regulated in such a way that the rate of flow of fluid through the outlet of the pump 20 increases when the torque rises above a value which is assigned to a predetermined position of the throttle valve in a motor vehicle.

Figure 2:
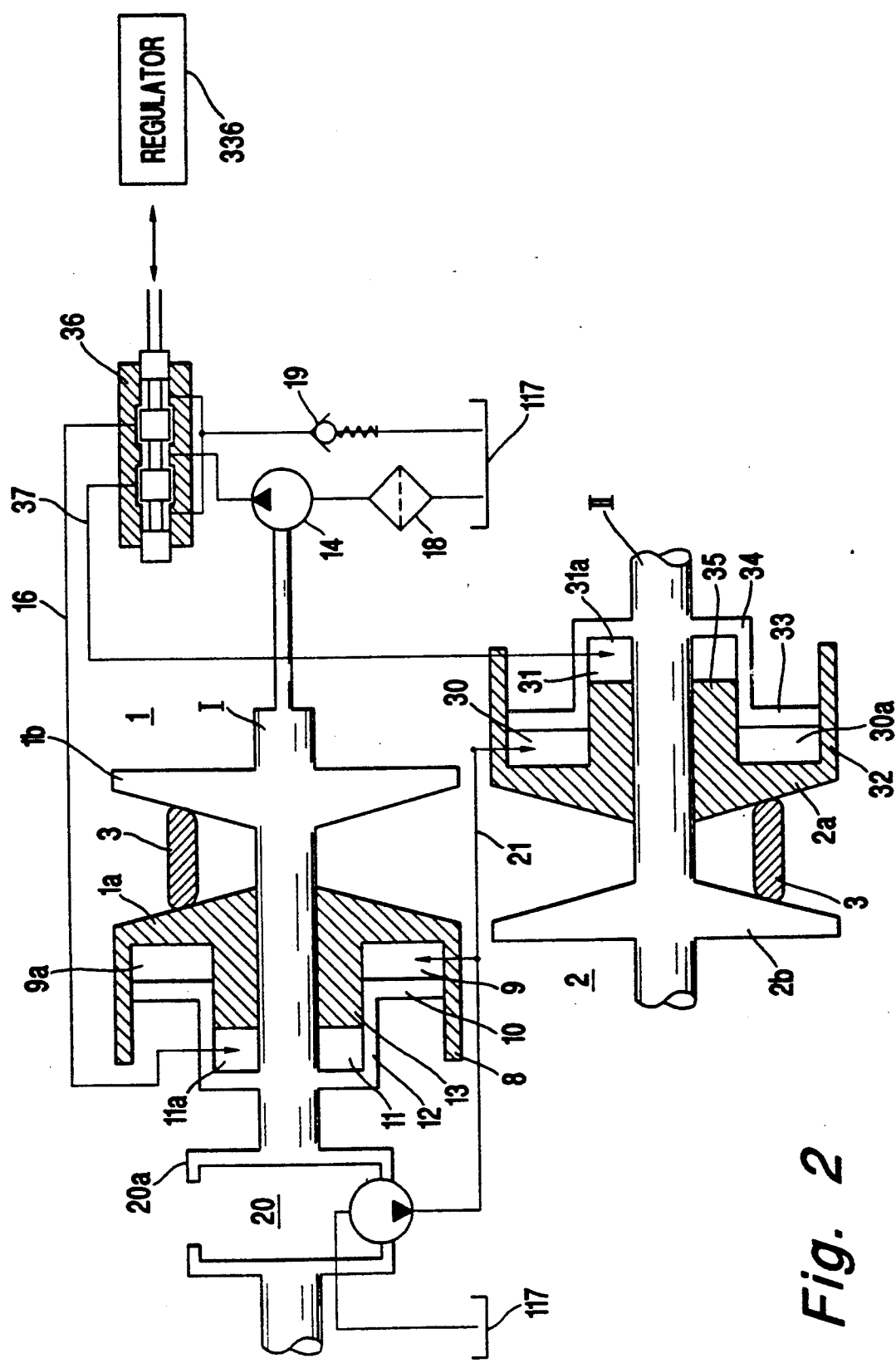
FIG. 2 is a similar fragmentary schematic partly elevational and partly axial sectional view of a modified continuously variable transmission.

FIG. 2 shows a second continuously variable transmission. All such parts of this transmission which are identical with or clearly analogous to corresponding parts of the transmission of FIG. 1 are denoted by similar reference characters. The construction of the cylinder and piston units 9 and 11 which can influence the axial position of the movable flange 1a of the first sheave 1 (on the input member I) is the same as described with reference to FIG. 1. The second cylinder and piston unit 6 of FIG. 1 is replaced with a cylinder and piston unit 30 having a piston 33 which is rigid with the output member II and a cylinder 32 which is rigid with the axially movable flange 2a of the sheave 2. The transmission of FIG. 2 comprises a further or additional cylinder and piston unit 31 which replaces the diaphragm spring 4 and includes a cylinder 34 rigid with the output member II as well as a sleeve-like piston 35 which constitutes a hub of the flange 2a. It will be noted that the piston 33 is mechanically connected to and operates in parallel with the cylinder 34. The unit 31 is disposed radially inwardly of the unit 30, i.e., it is nearer to the axis of the output member II than the unit 30. The cylinder chamber 30a of the unit 30 is connected with the cylinder chamber 9a by way of the conduit 21, and the cylinder chamber 31a of the unit 31 is connected with the output of the pump 14 by way of a modified slide valve 36 and a conduit 37. The pump 14 is driven by the input member I, and the housing 20a of the pump 20 is connected with the input member as well as with the parts 8, 12 of the units 9 and 11, respectively. The output of the pump 20 is connected with the cylinder chambers 9a and 30a by way of the conduit 21, i.e., with the chambers of those units which are more distant from the input member I and output member II than the units 11 and 31, respectively.

When the transmission ratio is changed as a result of a reduction of the volume of the cylinder chamber 11a or 31a, pressurized fluid which is expelled from the chamber 11a or 31a flows through the conduit 16 or 37, valve 36, relief valve 19 and back into the sump 117. If the volume of the chamber 9a is reduced, the conduit 21 conveys the thus expelled fluid into the chamber 30a, and vice versa.

The pump 14 supplies pressurized fluid to those cylinder and piston units (11 and 31) which are located nearer to the axes of the respective members I and II, i.e., to those units which serve to select the ratio of the improved transmission. When the volume of one of the cylinder chambers 11a, 31a is being reduced (as a result of movement of the flange 1a away from the flange 1b or as a result of movement of the flange 2a away from the flange 2b), the thus expelled fluid is conveyed (from the chamber 11a) via conduit 16, valve 36 and relief valve 19 or (from the chamber 31a) via conduit 37, valve 36 and relief valve 19.

An important advantage which is shared by all embodiments of the improved transmission is that the transmission is simple, compact and inexpensive. Moreover, the energy requirements are low and the percentage of lost fluid is equally low. Losses of fluid are attributable primarily or exclusively to leakage which is in contrast to the design of the transmission described in the aforediscussed German Pat. No. 28 28 347. Conveying of fluid must take place only when the transmitted torque develops peaks, i.e., it is not necessary to rely on continuous conveying of hydraulic fluid.

The pump 20 can constitute a gear pump, a piston pump or a vane pump. A gear pump is preferred at this time due to its simplicity. As mentioned above, the housing 20a of the gear pump 20 can rotate and, when the outlet of the pump 20 is closed, the pump hydrostatically transmits the received torque without losses (except for the minor losses due to eventual leakage). The pump 20 or an equivalent pump can be installed (depending on the nature of regulating means therefor) between the output and the sheave 2 and/or between the input and the sheave 1. It has been found that, when the transmission is used in a motor vehicle, it is advantageous to install the pump 20 in a manner as shown in FIGS. 1 and 2, i.e., between the prime mover PM and the sheave 1 on the input member I.

The valve 15 can constitute a 3/2-way shift ratio control valve with three ports and a reciprocable valving element which is movable between two end positions.

The valve 36 can constitute a ⅔-way shift ratio control valve with four ports and a valving element which is reciprocable between two end positions and an intermediate position. The two ports which communicate with the sump 117 can be considered as a single port because they normally communicate with each other in the body of the valve 36.

The valves 15 and 36 can be actuated by mechanical means, e.g., through the medium of an eccentric which can change its orientation in dependency upon the position of a device (such as a gas pedal or a fuel injection pump) which regulates the rate of delivery of fuel to an internal combustion engine and selects the transmission ratio by way of the valve 15 or 36. However, the position of the valving element in the valve 15 and/or 36 can also be adjusted in a number of other ways, i.e., not necessarily exclusively as a function of changes of fuel delivery but rather as a function of such changes and/or as a function of changes of one or more other parameters of the engine and/or other parts in a motor vehicle in which the improved transmission is being put to use. Still further, the illustrated shift ratio control valve 15 and/or 36 can be replaced with a valve wherein a solenoid changes the position of a valving element as a function of changes of one or more engine parameters and/or other parameters of a motor vehicle which embodies the improved transmission. Each such change of one or more parameters entails a change of the rate of energy supply to the solenoid. The solenoid or the reciprocable (or otherwise movable) valving element in the valve 15 and/or 36 can be connected with an electronic regulator (315 or 336) which receives signals denoting changes of one or more relevant parameters and processes and/or memorizes the thus received signals. The parameters can include the quantity of fuel which is supplied to the engine of a motor vehicle (e.g., the position of the gas pedal) and/or the RPM of the engine and/or the RPM of the output member of the transmission and/or the mode of operation of the vehicle as a function of the momentary position of a selector lever (e.g., while the vehicle is driven in reverse, energy-saving mode of operation, temperature of the engine, "sporting" mode of operating the vehicle and/or others).

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A continuously variable transmission comprising rotary input and output members; a prime mover for said input member; a first sheave on said input member; a second sheave on said output member, each of said sheaves having a first flange affixed to and a second flange movable axially of the respective member; an endless flexible element trained over said sheaves; means for displacing said flexible element radially of said sheaves including a first fluid-operated device having means for moving the second flange of said first sheave relative to the first flange of said first sheave, and a second fluid-operated device having means for moving the second flange of said second sheave relative to the first flange of said second sheave; and means for varying the pressure of fluid in said devices as a function of variations of torque which is transmitted between said members, comprising a pump continuously operated by said prime mover and transmitting torque to said input member.

2. The transmission of claim 1, wherein each of said devices comprises a hydraulic cylinder and piston unit.

3. The transmission of claim 1, wherein, said pump is installed between said prime mover and said first sheave.

4. The transmission of claim 1, wherein said pump is a hydrostatic pump.

5. The transmission of claim 1, wherein said pump is a gear pump.

6. The transmission of claim 1, wherein said pump constitutes a starting clutch.

7. The transmission of claim 6, wherein said pump has an outlet and further comprising means for regulating the flow of fluid via said outlet as a function of a driving command.

8. The transmission of claim 6, wherein said pump includes a rotary housing and further comprising means for controlling the speed of said housing as a function of a driving command.

9. The transmission of claim 8, wherein said controlling means comprises a brake.

10. The transmission of claim 1, wherein said pump is operative to transmit torque which is variable as a function of variations of at least one operating parameter.

11. The transmission of claim 1, further comprising an additional fluid-operated device in parallel with said first device, and a second pump connected with and arranged to supply fluid to said additional device, said additional device having means for moving the second flange of said first sheave relative to the first flange of said first sheave in conjunction with the moving means of said first device.

12. The transmission of claim 11, further comprising means for varying the pressure of fluid in said additional device as a function of changes of transmission ratio.

13. The transmission of claim 11, wherein said first device is disposed at a first distance and said additional device is disposed at a second distance from the axis of said input member.

14. The transmission of claim 13, wherein said first distance exceeds said second distance.

15. The transmission of claim 1, further comprising an additional fluid-operated device in parallel with said second device, and a second pump connected with and arranged to supply fluid to said additional device, said additional device having means for moving the second flange of said second sheave relative to the first flange of said second sheave in conjunction with the moving means of said second device.

16. The transmission of claim 15, further comprising means for varying the pressure of fluid in said additional device as a function of changes of transmission ratio.

17. The transmission of claim 15, wherein said second device is disposed at a first distance and said additional device is disposed at a second distance from the axis of said output member.

18. The transmission of claim 17, wherein said first distance exceeds said second distance.

19. The transmission of claim 1, wherein said second device includes a cylinder and piston unit having a cylinder chamber, and further comprising a diaphragm spring provided in said chamber to bias the second flange of said second sheave against said flexible element.

20. The transmission of claim 1, wherein said pump is a hydrostatic pump and includes a damper.

21. The transmission of claim 20, further comprising a prime mover and means for transmitting torque from said prime mover directly to said input member, said torque transmitting means including said pump.

22. The transmission of claim 20, wherein said pump includes an accumulator.

23. The transmission of claim 20, wherein said pump has an outlet and further comprising a prestressed valve to regulate the flow of fluid through said outlet.

24. The transmission of claim 20, wherein said pump has an outlet and further comprising a torque-regulated valve to control the flow of fluid through said outlet.

25. The transmission of claim 1, wherein said pump has an outlet and further comprising a prime mover, an adjustable clutch between said prime mover and said input member, and means for adjusting said clutch as a function of fluid pressure at said outlet.

26. The transmission of claim 1, further comprising a second pump, each of said pumps having an outlet and further comprising a prime mover, an adjustable clutch between said prime mover and said input member, and means for adjusting said clutch as a function of fluid pressure at the outlet of one of said pumps.

27. The transmission of claim 1, further comprising a prime mover, an adjustable clutch between said prime mover and said input member, and torque-dependent means for adjusting said clutch.

28. The transmission of claim 27, wherein said adjusting means is regulatable as a function of deviations of torque from that depending on predetermined operational parameters.

29. The transmission of claim 1, wherein said pump is arranged to deliver variable quantities of hydraulic fluid and said devices include portions which are deformable to accommodate the fluid which is delivered by said pump when the transmitted torque assumes a predetermined value.

30. The transmission of claim 29, wherein said portions include expandible walls.

31. The transmission of claim 1, wherein said displacing means further includes at least one diaphragm spring reacting against one of said members and bearing upon the respective second flange to urge such flange against said flexible element.

32. The transmission of claim 31, wherein said one member is said output member.

33. The transmission of claim 31, wherein said at least one spring has a degressive characteristic curve and is operative to bias the respective second flange with a greater force when said flexible element is nearer to the axis of said input member and with a lesser force when said flexible element is more distant from the axis of said input member.

34. The transmission of claim 31, wherein said displacing means further comprises a fluid-operated device including a cylinder and piston unit arranged to move the second flange on said one member axially of said one member, said unit having a cylinder chamber and said at least one spring being disposed in said chamber.

* * * * *